United States Patent
Harman

(10) Patent No.: US 8,833,013 B2
(45) Date of Patent: Sep. 16, 2014

(54) TERMINATION COLLAR FOR AIR DUCT

(76) Inventor: Rodney James Harman, Whistler (CA)

(*) Notice: Subject to any disclaimer, the term of this patent is extended or adjusted under 35 U.S.C. 154(b) by 106 days.

(21) Appl. No.: 13/588,266

(22) Filed: Aug. 17, 2012

(65) Prior Publication Data

US 2013/0043671 A1    Feb. 21, 2013

Related U.S. Application Data

(60) Provisional application No. 61/575,358, filed on Aug. 18, 2011.

(51) Int. Cl.
*E04C 2/52* (2006.01)
*F16L 3/00* (2006.01)
*F24F 13/02* (2006.01)

(52) U.S. Cl.
CPC ............. *F16L 3/003* (2013.01); *F24F 13/0209* (2013.01); *F24F 13/02* (2013.01)
USPC ......................... 52/220.8; 52/514.5

(58) Field of Classification Search
CPC ................. F16L 5/00; F16L 5/10; H02G 3/22
USPC ......... 52/220.8, 745.15, 514.5; 454/292, 332; 174/58; 248/205.3
See application file for complete search history.

(56) References Cited

U.S. PATENT DOCUMENTS

| | | | |
|---|---|---|---|
| 1,961,497 A * | 6/1934 | Klomparens | 454/331 |
| 2,936,979 A * | 5/1960 | Epstein | 248/57 |
| 2,965,342 A * | 12/1960 | Goldstone | 248/57 |
| 2,966,837 A | 1/1961 | Radcliff | |
| 3,105,664 A * | 10/1963 | Poradun | 248/56 |
| 3,684,220 A * | 8/1972 | Logsdon | 248/56 |
| 3,885,852 A * | 5/1975 | Grove | 439/441 |
| 3,888,013 A * | 6/1975 | Benoit | 33/528 |
| 4,023,697 A * | 5/1977 | Marrero | 220/3.4 |
| 4,176,758 A * | 12/1979 | Glick | 220/3.3 |
| 4,309,007 A * | 1/1982 | Logsdon | 248/56 |
| 4,397,223 A | 8/1983 | Maxson | |
| 4,408,262 A * | 10/1983 | Kusmer | 362/147 |
| 4,673,149 A * | 6/1987 | Grote et al. | 248/343 |
| 4,760,981 A * | 8/1988 | Hodges | 248/57 |
| 5,058,490 A * | 10/1991 | Sodec et al. | 454/290 |

(Continued)

FOREIGN PATENT DOCUMENTS

CA        2369490 A1    7/2003

OTHER PUBLICATIONS

International Searching Authority, ISR, PCT/CA2012/050567, Nov. 6, 2012, 7 pages.

(Continued)

*Primary Examiner* — Basil Katcheves
(74) *Attorney, Agent, or Firm* — Dwayne E. Rogge; Schacht Law Office, Inc.

(57) ABSTRACT

The apparatus disclosed herein serves as a termination point for a connection of metal pipe, plastic pipe, flexible pipe, or duct elbows to a diffuser through a wall, ceiling, or similar surface structure. The projection portion of the apparatus into which the diffuser is installed is substantially rigid, and thus generally prohibits deformation and damage as the apparatus and surrounding surface/structure is installed. For modification, break points and tear-away markers may be provided to aid in removal of portions for specific applications such as low internal clearance.

15 Claims, 15 Drawing Sheets

(56) References Cited

U.S. PATENT DOCUMENTS

| | | | |
|---|---|---|---|
| 5,109,756 A | 5/1992 | Barboza et al. | |
| 5,221,069 A * | 6/1993 | Struthers et al. | 248/231.9 |
| 5,275,333 A | 1/1994 | Tamblyn | |
| 5,411,438 A * | 5/1995 | White et al. | 454/300 |
| 5,628,087 A * | 5/1997 | Gretz | 16/2.1 |
| 5,983,496 A * | 11/1999 | Hermanson | 29/890.15 |
| 6,290,596 B1 * | 9/2001 | Birdsong et al. | 454/289 |
| 6,478,673 B1 | 11/2002 | Haynes | |
| D478,872 S * | 8/2003 | Heggem | D13/152 |
| 6,672,029 B2 | 1/2004 | Tucker | |
| 6,752,361 B2 * | 6/2004 | Chou | 248/74.1 |
| 7,022,010 B1 | 4/2006 | Cardon | |
| D525,354 S | 7/2006 | Nishizawa | |
| 7,108,600 B1 | 9/2006 | Krzyskowski et al. | |
| 7,140,960 B2 * | 11/2006 | Pilger | 454/331 |
| D563,542 S * | 3/2008 | Wettergren | D23/388 |
| 7,596,914 B2 * | 10/2009 | Stahl et al. | 52/220.8 |
| D607,555 S | 1/2010 | Nishizawa | |
| 7,641,125 B2 * | 1/2010 | Rimmer et al. | 236/49.3 |
| 7,645,189 B2 * | 1/2010 | Pilger | 454/330 |
| 7,654,361 B2 * | 2/2010 | Combest | 181/150 |
| 8,575,484 B1 * | 11/2013 | Witherbee | 174/58 |
| 2003/0177724 A1 | 9/2003 | Botting | |
| 2005/0201571 A1 * | 9/2005 | Saint-Vincent et al. | 381/87 |
| 2008/0142646 A1 | 6/2008 | Magno et al. | |
| 2008/0318511 A1 | 12/2008 | Becker | |
| 2009/0020306 A1 * | 1/2009 | Purves et al. | 174/58 |

OTHER PUBLICATIONS

Airtec, "Installation Guide for Model MV or MX Diffuser", 1 page.
Duratite Systems Collars, Product Website www.duratite.com/products/, 2 pages.
Eneready Products Ltd., "SpeediSleeve" Ecco Supply Brochure, 1 page.
Lifebreath Indoor Air Systems, "EasyAir Grilles/Elbows/Diffuser", 1 page.
Nu-Air, "4-inch Stackhead", 1 page.
Primex Construction, "Squeeze Elbow" 1 page.
Fantech, "MGE Series Adjustable Metal Exhaust Grille w/Metal Mounting Collar for 5" Duct", http://www.pexsupply.com/Fantech-MGE5-MGE-Series-Adjustable-Metal-Exhaust-Grill, 1 page.
S&P, "Premium Grille" Steel Collar, 1 page.

* cited by examiner

TERMINATION COLLAR FOR AIR DUCT

RELATED APPLICATIONS

This application claims priority benefit of U.S. Ser. No. 61/575,358, filed Aug. 18, 2011.

The contents of the application(s) listed above are incorporated herein by reference.

BACKGROUND OF THE DISCLOSURE

Field of the Disclosure

This disclosure relates to the field of termination collars for round diffusers and grilles used in air distribution for heating, cooling, and ventilation duct systems. The disclosed device in several examples is designed to improve upon the apparatus and prior methods for installation of ductwork in ceilings or walls. The disclosed apparatus has been designed to improve and ensure a proper fit for diffusers and/or grilles into a finished ceiling or wall.

SUMMARY OF THE DISCLOSURE

Disclosed herein is a termination collar in one example comprising: a main body having a substantially cylindrical inner surface; and a plurality of vertical attachment arms projecting radially from the main body. Each vertical attachment arm in one example has a vertical attachment surface for attachment to a vertical side of a support joist. Also disclosed is at least one horizontal projection having a horizontal top surface for attachment to a horizontal bottom side of a support joist. The termination collar also having in one example an air duct attachment surface on the main body.

The termination collar as disclosed may be arranged wherein the termination collar is cast from a single mold.

The termination collar as disclosed may further comprise a plurality of circumferential tear-away markers provided on the air duct attachment surface wherein the tear-away markers assist a user in removing equal diameter tear-away portions of the termination collar for low clearance applications.

The termination collar as disclosed may be arranged wherein the tear-away markers extend circumferentially only partially around the termination collar for low clearance angle applications.

The termination collar as disclosed may be arranged wherein the horizontal projection comprises a thin portion to be positioned between an attachment joist and a final wall/ceiling surface.

The termination collar as disclosed may further comprise a circumferential flange having a plurality of surfaces defining diffuser attachment holes for connection to fasteners of a diffuser.

The termination collar as disclosed may further comprise an alignment indicator radially inward from and circumferentially aligned with the diffuser attachment holes.

The termination collar as recited herein wherein the vertical attachment arm(s) comprise a lateral break point to aid in removing a portion of the attachment arm(s).

A method for installing a termination collar is also disclosed, the method comprising the steps of: selecting a termination collar with a protrusion portion having an inner diameter slightly larger than the outer diameter of an insert portion of a diffuser to be installed; fastening at least one vertical attachment arm of the termination collar to a vertical surface of a joist; fastening a horizontal projection of the termination collar to a horizontal surface of the joist such that the projection portion of the termination collar extends outward of the joist; attaching ductwork to a duct attachment surface vertically opposite the protrusion portion; installing a final interior surface to the joist(s) wherein the final surface has a surface defining a hole surrounding the projection portion of the termination collar; and installing a diffuser to cover the surface defining a hole in the final surface.

The method for installing a termination collar as disclosed may further comprise a step wherein the diffuser comprises an extension portion, and the extension portion is press-fit into the protrusion portion of the termination collar.

The method for installing a termination collar as disclosed may further comprise a step wherein the diffuser comprises a circumferential flange, and the circumferential flange is fastened to a circumferential flange projecting radially outward of the protrusion portion of the termination collar.

The method for installing a termination collar as disclosed may further comprise a step of removing at least one circumferential tear-away portion from the termination collar to facilitate installation in a low clearance application.

The method for installing a termination collar as disclosed may further comprise a tear-away portion which does not extend circumferentially around the entire termination collar.

The method for installing a termination collar as disclosed wherein the vertical attachment arm(s) comprise a lateral break point and the method further comprises the step of removing a portion of the attachment arm(s) along the lateral break point.

DESCRIPTION OF THE PREFERRED EMBODIMENTS

Figure 1:
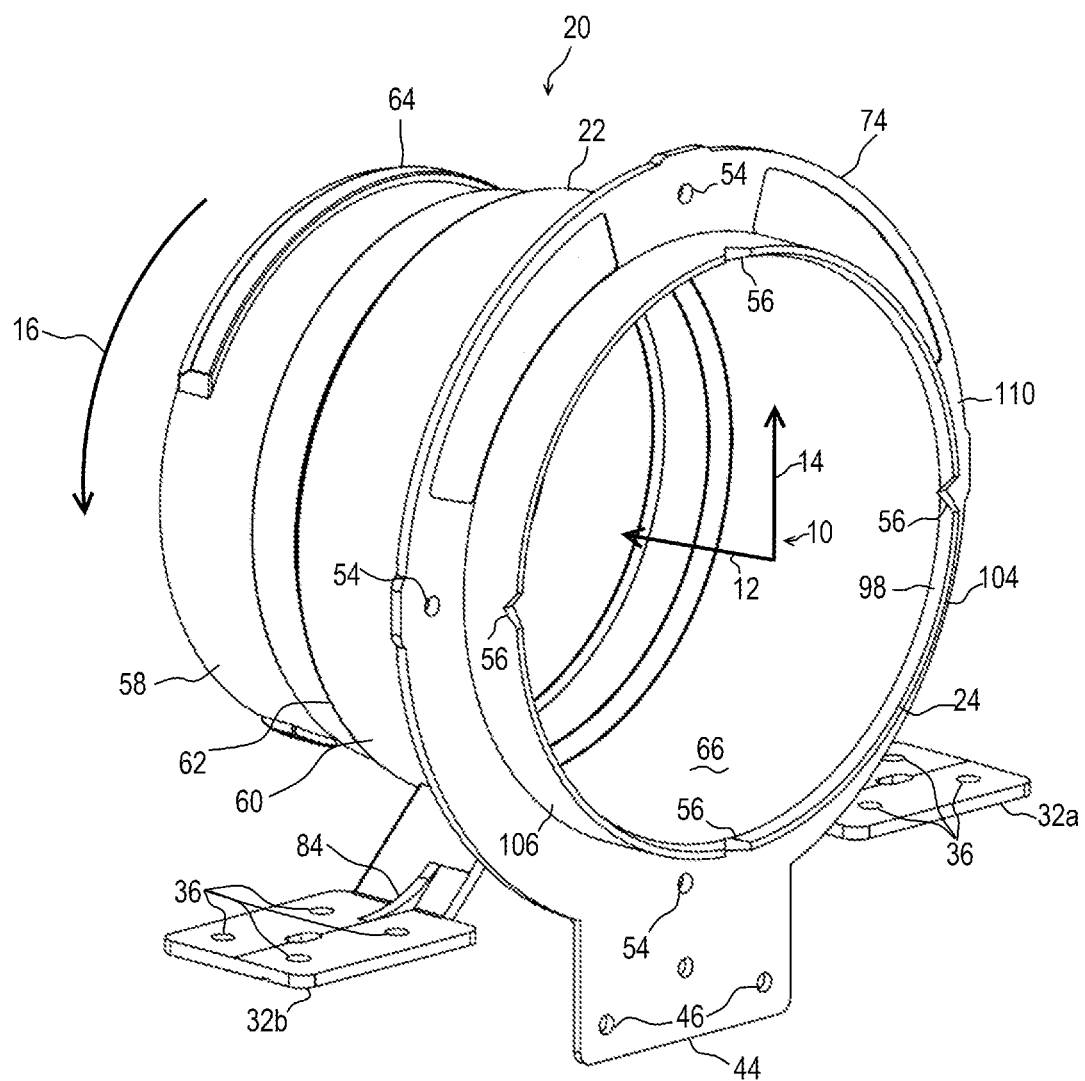
FIG. 1 is a perspective view of one example of the disclosed apparatus.

This disclosure relates to the field of terminations for round ducting and collars for diffusers and grills used in air distribution heating, cooling, and ventilation duct systems. This disclosure is designed to improve installation time and cost of HVAC systems which terminate the duct system in a ceiling or wall.

In a typical residential installation, an installer will terminate the round duct to a ceiling joist or wall stud. The ductwork may be sheet metal or flexible ductwork. One problem with this installation is that the installation leaves the round metal edge vulnerable to damage especially as the final surface which is an interior wall or ceiling surface (commonly wall board or drywall) is installed. Drywall is a common name for a plasterboard of gypsum between paper. The damage that most often occurs, is that the round metal edge of the termination collar is deformed from round, resulting in difficulty during final installation of a diffuser. The ceiling is normally finished prior to installation of such diffusers, and thus repairing an oval or distorted duct is very difficult.

Other installations utilize a plastic and/or metal sleeve for termination of the interior ductwork. Such sleeves have been used with some success in the residential construction market. They are commonly designed to be installed on wood ceiling joists. Such simple sleeves are commonly designed to be fastened with long wooden nails or long wood screws through at least a portion of the sleeve into a joist. Such applications often result in difficult installation on steel studs and joists. In addition, such plastic sleeves commonly known in the market only allow for installation in one configuration. They do not allow for modification during the installation process. There are often installation requirements where an installer must support the product along both sides, not just the pre-determined fastening points. Such known prior art plastic sleeves do not allow for such modification. They commonly utilize a solid lower flange that does not permit the product to be installed on any ceiling or wall that has two or more sheets of drywall, or any ceiling or wall that has a wood paneling applied over the first layer of drywall. Such plastic sleeve connections allow for a pipe or elbow to be attached vertically below a desired position wherein screws or other fasteners projected into the interior surface of the plastic sleeve will result in difficulty in installing most diffusers. In other words, the fastener projects inward and installation of an insert or partial insert diffuser is prohibited by the projecting fastener.

In a common installation, an installer will terminate the duct work which is often either round sheet metal or a flexible duct adjacent or just below a ceiling joist or just inside of a wall stud so that the ductwork protrudes approximately ½ inch into the room prior to application of the final surface. When the final surface is installed, provided that the final surface is at least ½ inch thick, the collar will not project into the room, and the installer will not need to "trim" the collar as is common in current art installations. This projection is often an estimate of what the finished ceiling or wall thickness will be. One concern with this method is that the method leaves the round metal edge or the projection portion vulnerable to be damaged from others and as mentioned above is often damaged by the installation of the finishing wall or ceiling. Commonly this is drywall which can be especially damaging to its weight and rigid nature. Damage that most often occurs is that the ductwork is bent or deformed out of round. This is significantly detrimental when it comes to installation of a diffuser which is commonly not deformable to fit other than round ductwork. The interior surface is commonly finished by this time, and the diffuser installer is forced to attempt to install a round diffuser into an oval or other shaped hole.

The apparatus disclosed herein serves as a termination point for a connection of metal pipe, plastic pipe, flexible pipe, or duct elbows to a diffuser. The projection portion of the apparatus into which the diffuser is installed is substantially rigid and thus generally prohibits deformation and damage.

In this disclosure, to aid in description of the apparatus and method, the term diffuser will be used to encompass not only diffusers but also grilles, registers, and other ductwork terminations of equivalent application including unrestricted openings. Likewise, the terms "joist" and "stud" are used herein generally interchangeably. Additionally, while the apparatus can be utilized in a ceiling, wall, or potentially a floor, cabinet, or other interior structural surface, the term "ceiling" will be used to encompass all of these to aid in description.

Several advantages are provided to the installer by the disclosed apparatus. The first advantage is that the apparatus is designed to be easily utilized with wood, metal, and other material ceiling and wall joists. In addition, the vertical attachment arms extended radially outward past the outer surface of the collar section to increase ease and installation when using a hammer, screwdriver or similar tool, or with exceptionally long fasteners. In addition, the design of the vertical attachment arms increases the ease of installation of duct/foil tape or duct sealer. In some applications, the collar comprises break-off or tear-off portions to accommodate ceilings with a finished thickness more than the thickest application of drywall for which the particular collar is formed. Additionally, a duct stop point is formed in the collar section which ensures that the installer will not accidentally fasten through the collar at a point that would interfere with installation of a diffuser.

Before continuing with a detailed description an axis system 10 is shown in FIG. 1 generally comprising a longitudinal axis 12 aligned with the center of the collar section and a radial axis 14 which is orthogonal to the longitudinal axis 12. In addition, a circumferential direction 16 is shown generally tangential to the radial axis 14. Each of these axes and directions and the relative positions they represent (vertical, horizontal, etc.) are intended to aid in the description of the disclosed apparatus and method and are not intended to be read into the limitations of the claims.

In one example, the disclosed termination collar 20 is formed at a single molded casting formed of polymer material such as for example polypropylene. Such a unitary body casting results in a lightweight and strong product which is inexpensively and easily formed.

Figure 16:
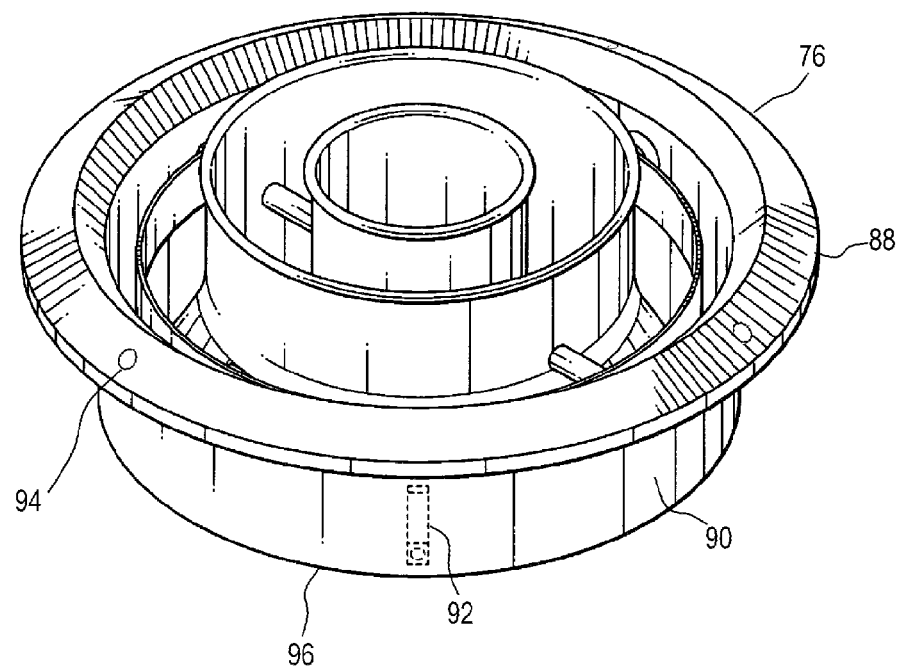
FIG. 16 is a prior art diffuser/grille.

One example of the sizes utilized is a termination collar 20 having a collar section 22 with a bottom opening 24 with a radial diameter of 4 3/16". Another example is a termination collar 20 with a bottom opening 24 with a radial diameter of 4 9/16 inch. Both examples may have a height in the longitudinal direction 12 of approximately 3½". These examples correspond to two common sizes of small-duct high-velocity supply outlet diffusers. Such small-duct systems are common in residential and light commercial applications. One example of such a diffuser is shown in FIG. 16 and will be described in more detail.

As the disclosed termination collar 20 is relatively small, can be made of lightweight materials, can easily be made durable with few if any sharp edges; installation and use is greatly assisted. Once the correct size of termination collar 20 is selected for the particular application, the termination collar is fastened to the joist by screws, nails or other fasteners and the ductwork is attached to the duct attachment surface 30. A wire tie, zip tie, duct tape, screw, nail, or other such apparatus may be added to further secure the ductwork to the termination collar. The final surface (generally drywall) is installed and the diffuser 76 is installed.

Figure 8:
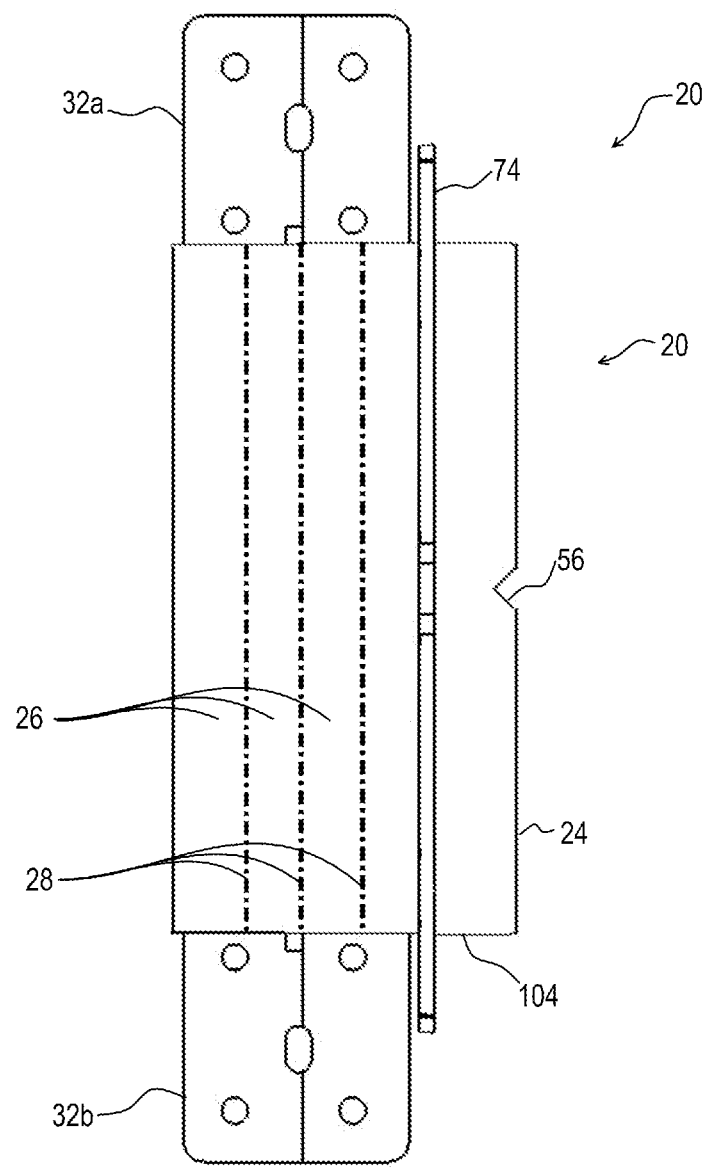
FIG. 8 is a front parallel projection view of the example of FIG. 1 with some modifications.
Figure 9:
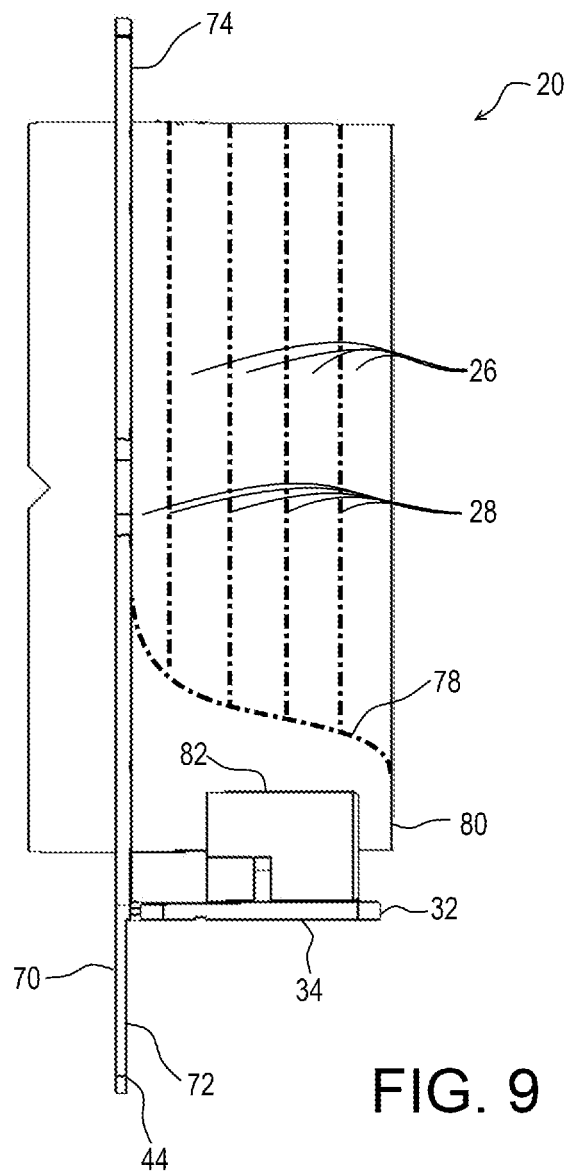
FIG. 9 is a side view of the example of FIG. 8.
Figure 10:
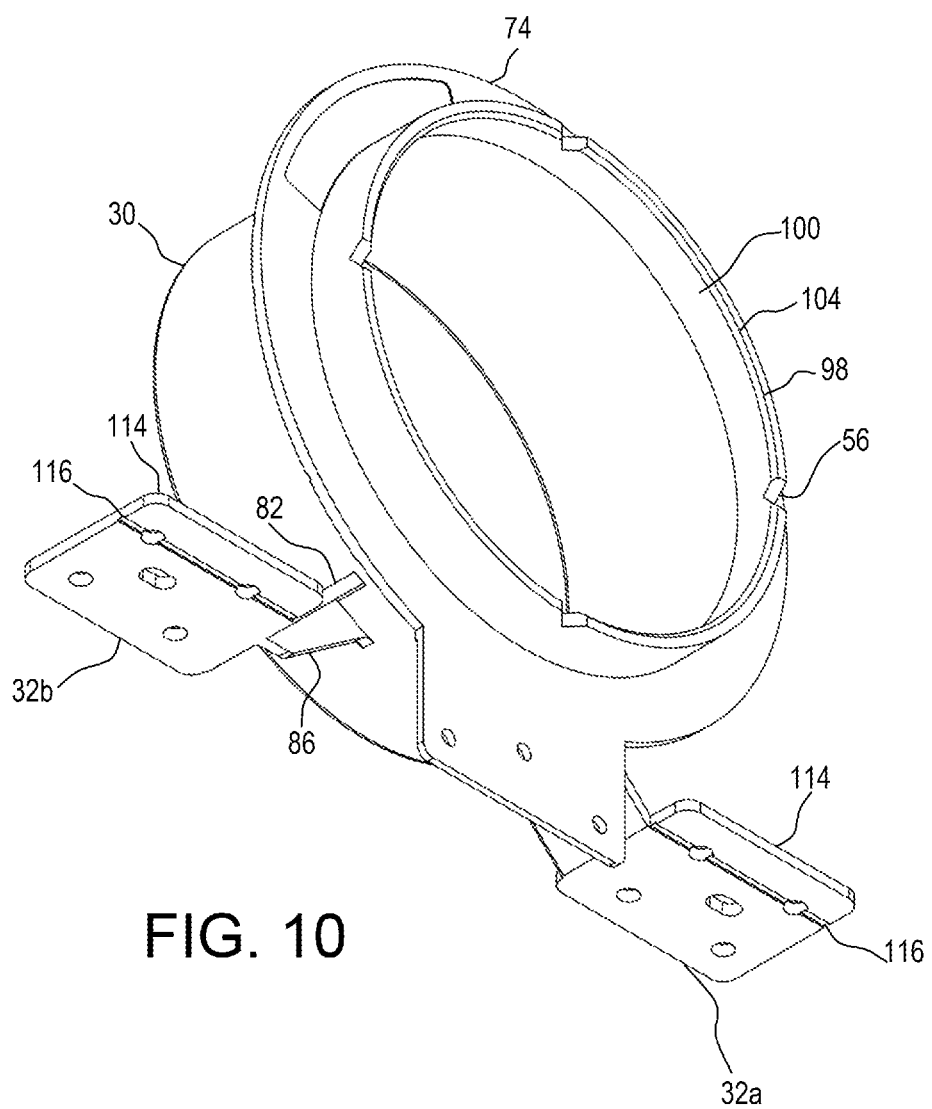
FIG. 10 is a perspective view of the disclosed apparatus.
Figure 11:
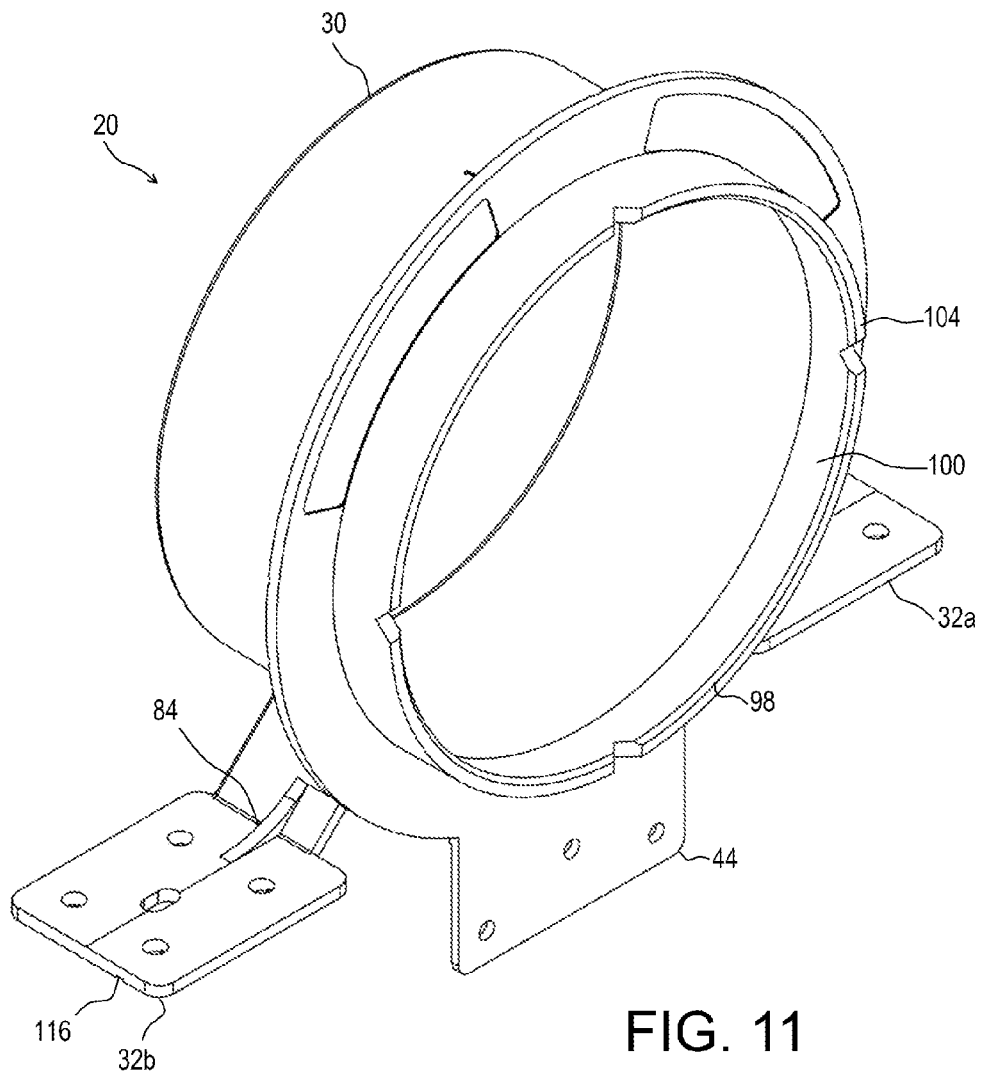
FIG. 11 is another perspective view of the example of FIG. 10.
Figure 12:
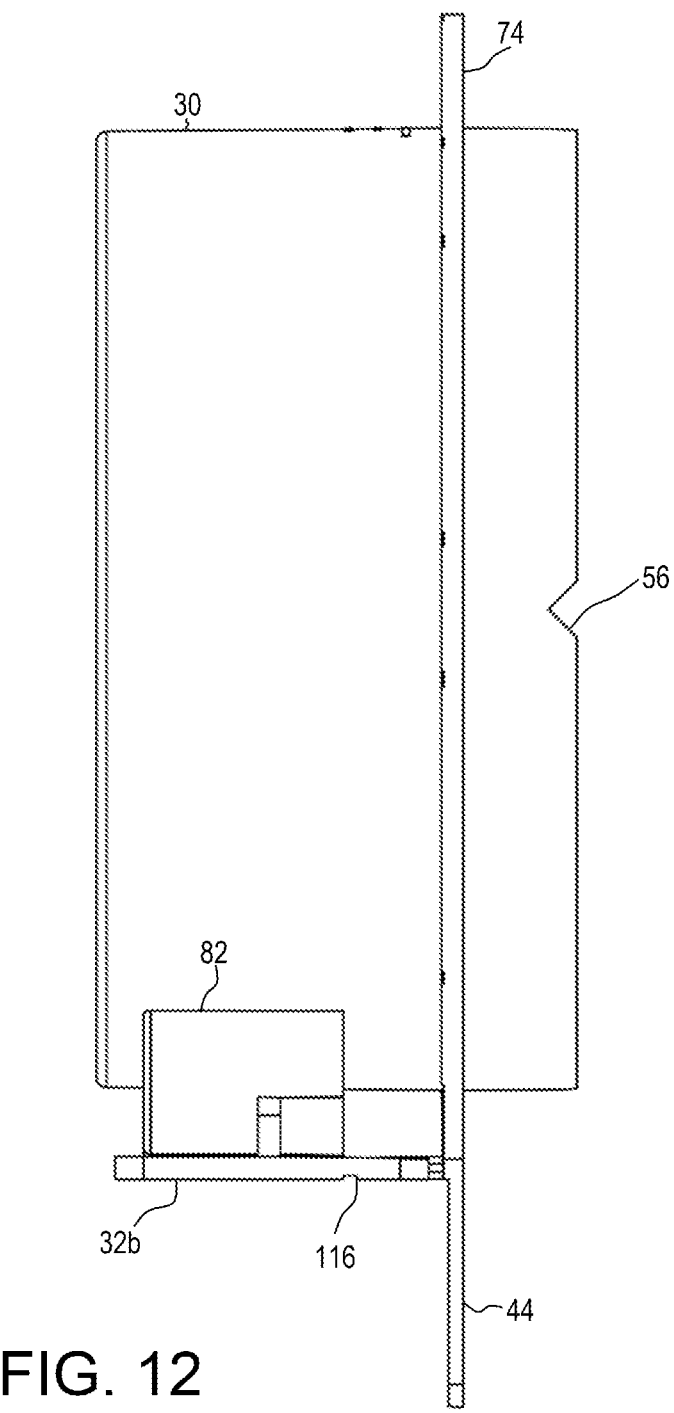
FIG. 12 is a side projection view of the example of FIG. 10.

As previously mentioned, the termination collar 20 can be secured to the joists of walls provided that the space behind the wall has the clearance for the termination collar 20 and ductwork. If insufficient clearance is available, a tear-away portion 26 as shown in FIG. 8 may be removed to reduce the clearance required for installation. In one form, the equal diameter tear-away portions 26 are facilitated by a tear-away marker 28 such as a small groove, series of holes, or other structure which aids in removing of the tear-away portion 26 along the tear-away markers 28. In one example, pliers or similar tools may be used to grip, twist, and/or tear the apparatus cleanly along the tear-away markers 28 without the need for any cutting tools. While three tear-away portions 26 are shown in FIG. 8, other numbers of tear-away portions 26 may be utilized. In addition, the termination collar 20 may be applied in other applications such as ceilings etc. In some applications, only a circumferential portion of the termination collar need be removed, such as when the duct comprises a bend immediately adjacent the termination collar. In such an application, a tear-away end marker 78 may be incorporated such that when the tear-away portions 26 are removed, a non-removed portion 80 remains. This increases stability of the overall termination collar as the shoulders 82 of the arms 32 may remain as well as the adjacent portion of the termination collar 20.

In some applications, the termination collar may be installed in relatively thick final surfaces, such as a double thickness final surface of two layers of material. In these and similar applications, it may be desired to break off a portion 114 of the vertical attachment arms 32 such as along scored lines 116.

In some applications, an assembly is provided with a first connector part which is traditionally attached to the interior side of the final surface inside the wall or ceiling and a second connector part which is positioned outside the wall or ceiling, and is attached to the first part by clips, fasteners or a bayonet mount. Most termination collars do not function with this assembly, but the disclosed assembly in some examples can be used when all of the tear-away tabs are removed, thus the overall apparatus is generally no thicker than the final surface thickness, and will not interfere with attachment of the inner and outer parts.

In common residential applications, the installer would fasten the termination collar 20 with wood screws, nails, or similar fasteners to wood joists. However, in other applications joists made of steel, other metals, polymers, or many other materials are used for ceiling joists. The disclosed termination collar 20 is easily mounted with screws into such materials. Often, in metal applications the screws are commonly known in the industry as self-tapping screws.

Figure 2:
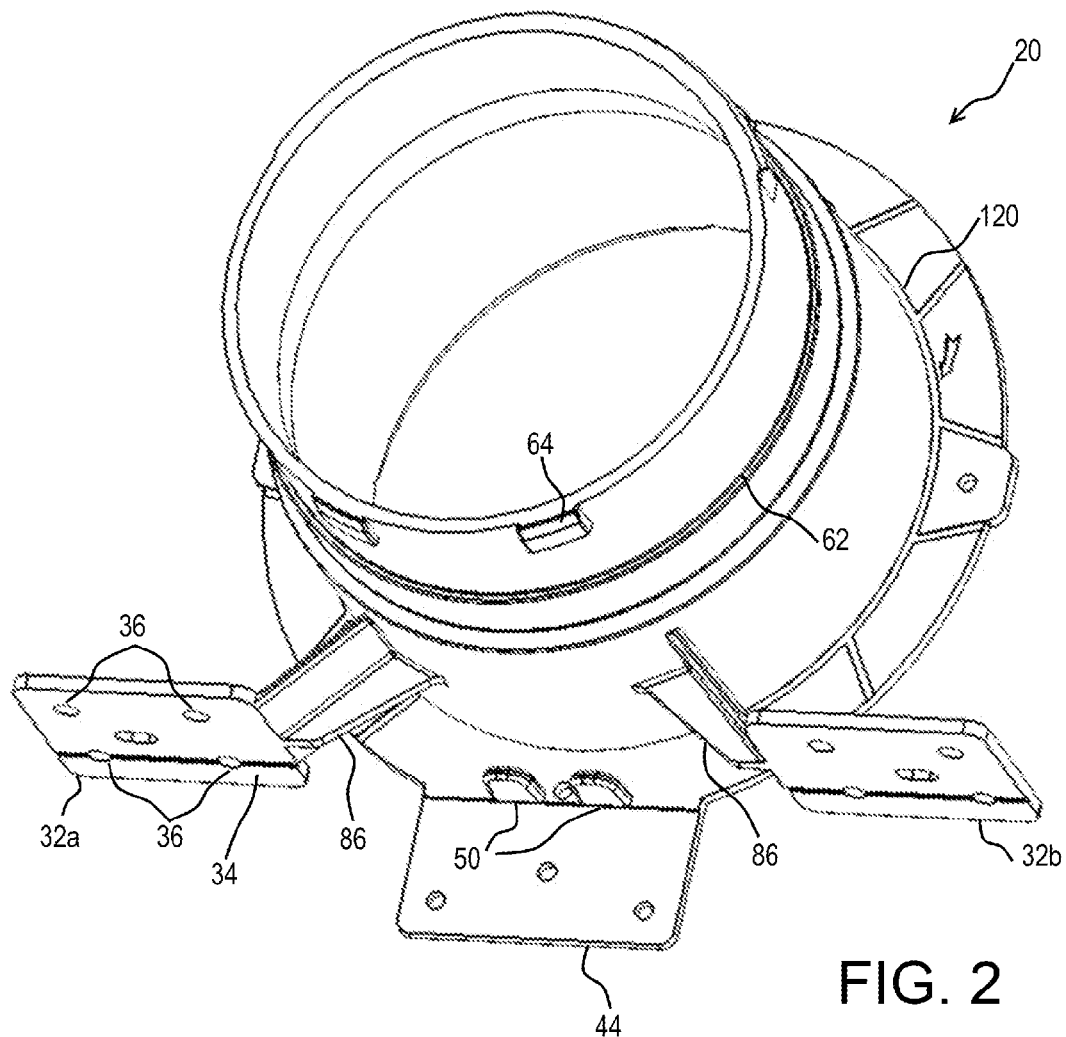
FIGS. 2-5 are perspective views of the example of FIG. 1 from a different viewing angle.
Figure 6:
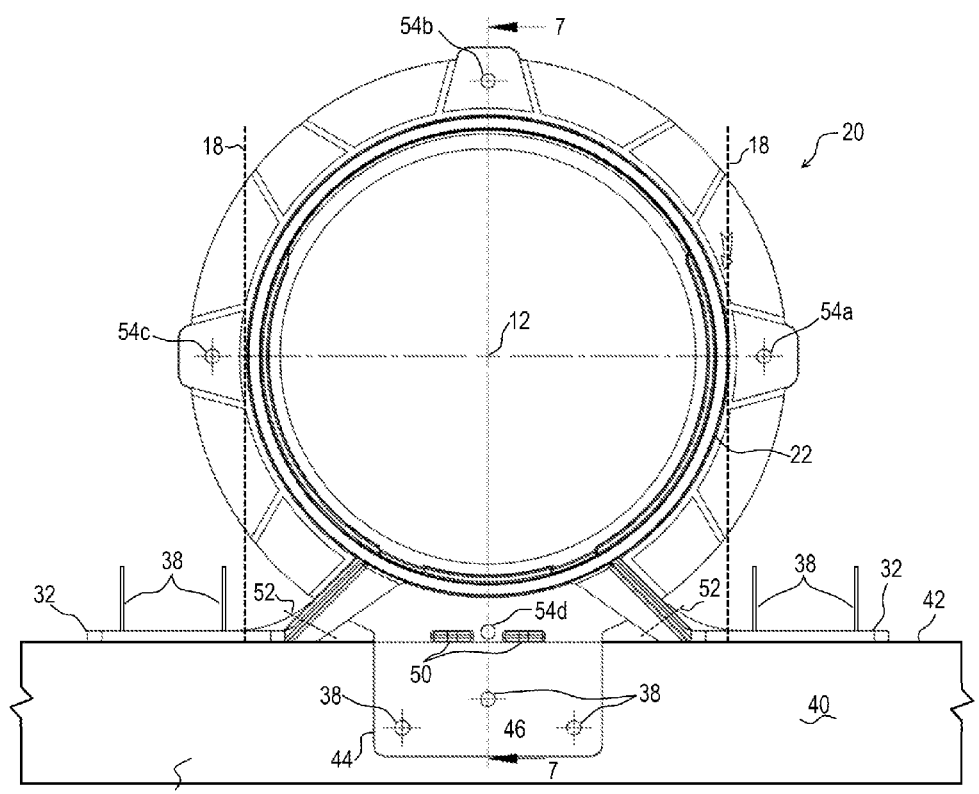
FIG. 6 is an end parallel projection view of the example of FIG. 1.

In one example, a plurality of vertical attachment arms 32*a* and 32*b* extend radially outward from the collar section 22. An alpha numeric numbering system is utilized herein with a numeric identifier or prefix indicating a general structure and an alphabetic suffix denoting particular elements of the general structure. For example, the numeric identifier 32 denotes the vertical attachment arms while specific vertical attachment arms are indicated at 32*a* and 32*b*. Looking to FIG. 2, one example of the vertical attachment arms 32 is shown with a vertical attachment surface 34 which contacts the vertical surface of a joist and fasteners 38 such as shown in FIG. 6 are installed through the surfaces defining voids 36 to attach the termination collar 20 to the joist 40.

Likewise, in one example a horizontal projection 44 protrudes radially from the collar section 22. The horizontal projection 44 may also include surfaces defining voids 46 through which fasteners 38 pass to attach the termination collar 22 to a horizontal surface 48 of the joist 40. This horizontal projection 44 in combination with surface 34 and alignment tabs 50 functions as a 90° back-stop to ensure a level mounting position of the termination collar 20 relative to the final surface or ceiling. This horizontal projection 44 also assures that the installer has correctly placed the termination collar 20 not only level (in a ceiling installation), but also perpendicular to the joist.

Figure 7:
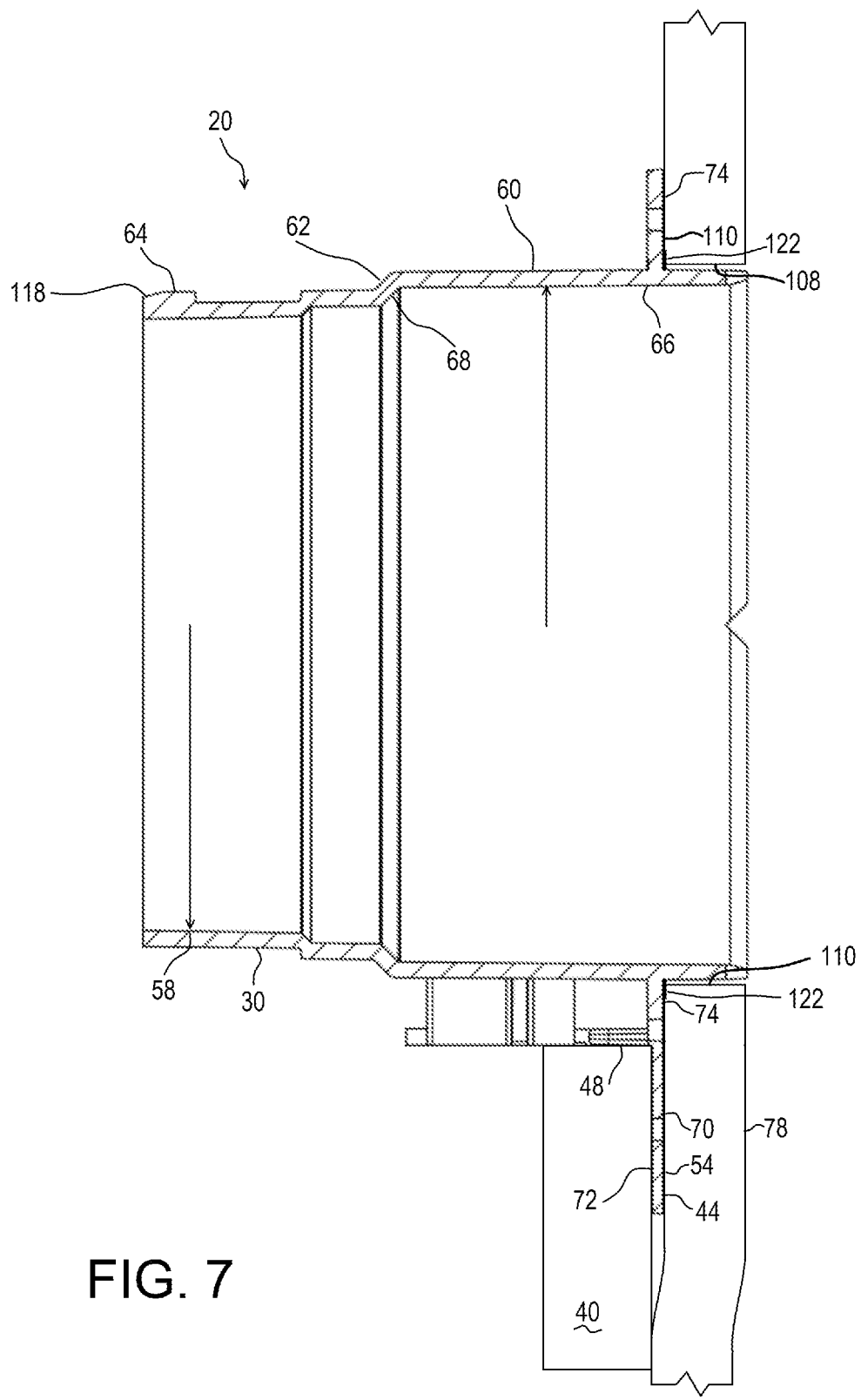
FIG. 7 is a side cutaway view of the example of FIG. 1.

Looking to FIG. 7, it can be seen how one example of the horizontal projection 44 comprises a vertically thin region 70 adjacent the horizontal top surface 72 which contacts the surface 48 of the joist 40. This thin region 70 is provided so that when the final surface 78 (drywall) is attached, the horizontal projection 44 will not result in a significant bulge in the final surface 78 due to the projection 44 and fasteners fitted therethrough. Generally, the thin region 70 in some applications is thinner than the remainder of the circumferential flange 74. The circumferential flange 74 is also provided to add rigidity and stability to the termination collar. As described, it is desired that after installation of the termination collar 20 and final surface 78 that at least the projection portion 104 remains a true cylinder.

Figure 3:
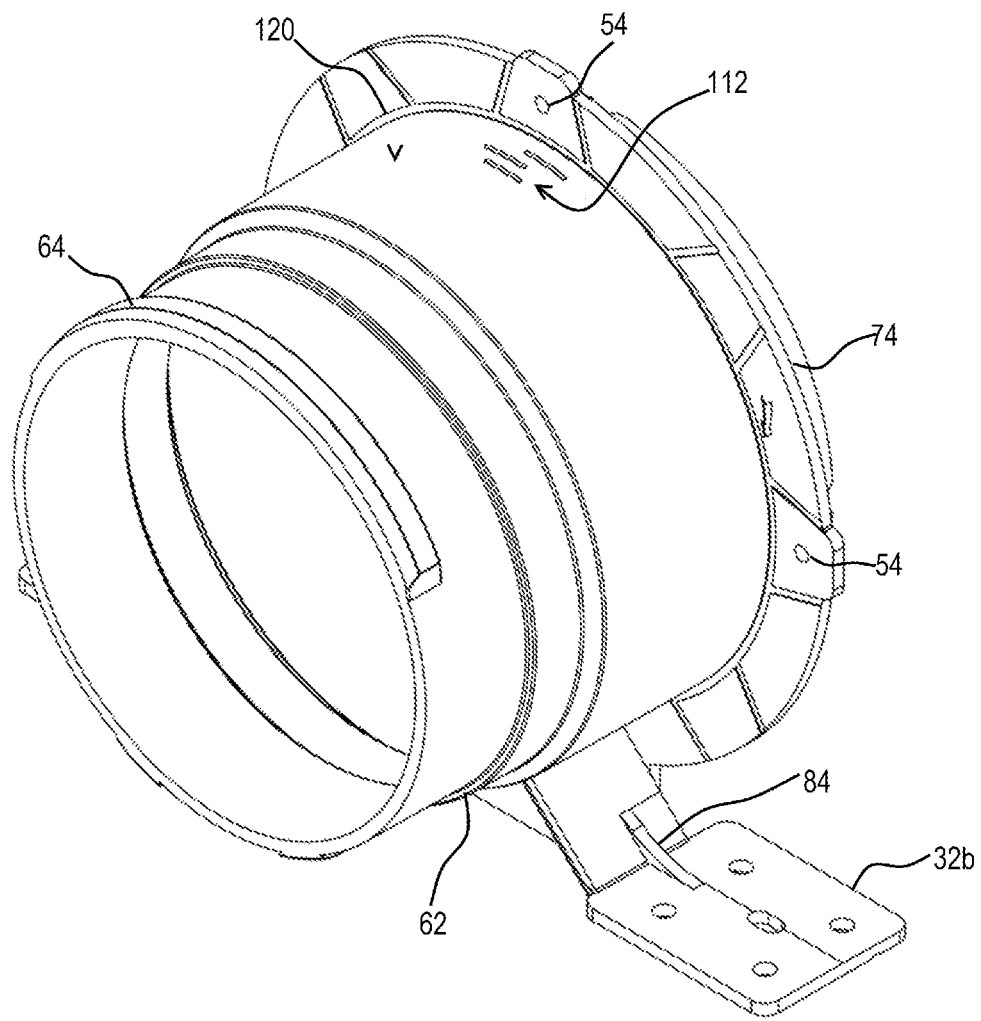
Figure 4:
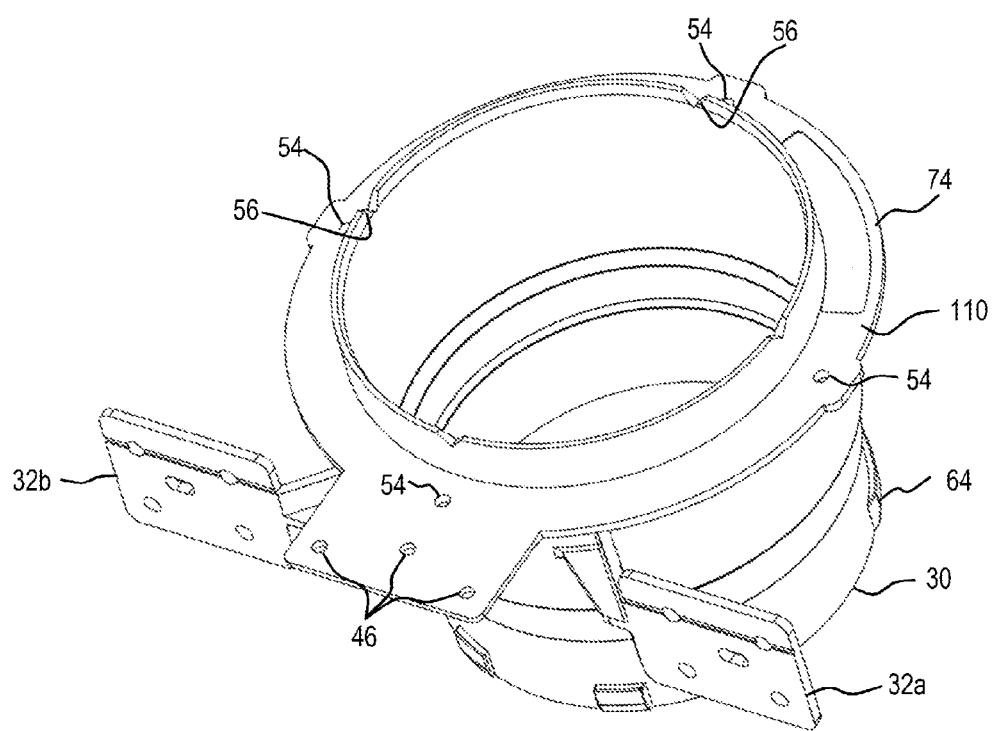
Figure 5:
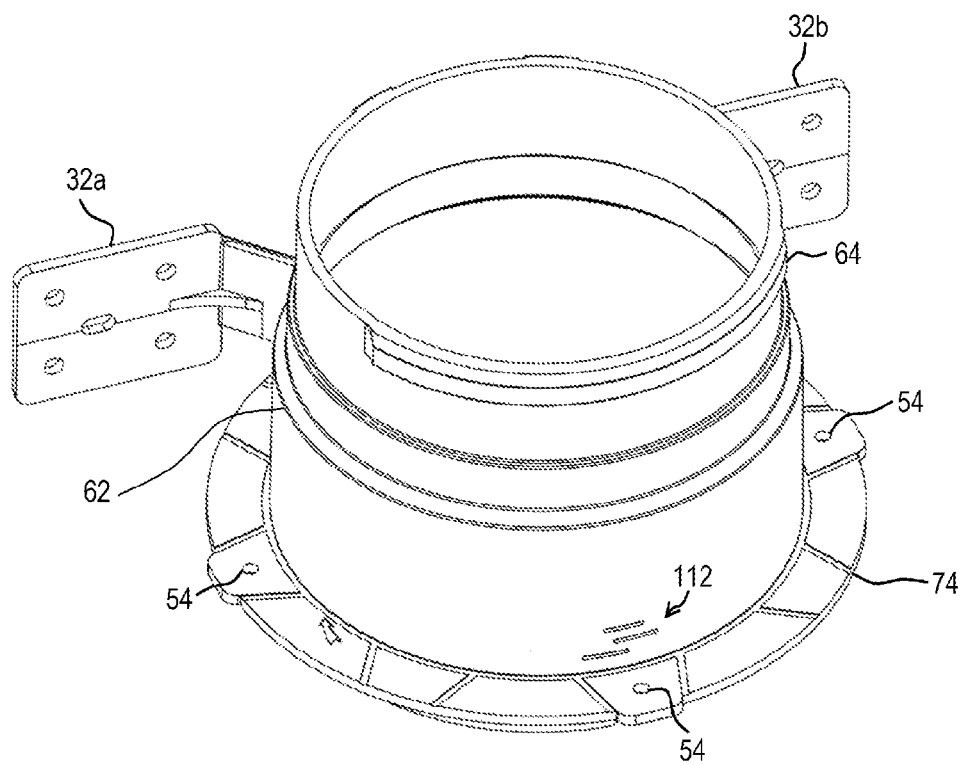

In one example, alignment tabs 50 may be provided to assist in alignment of the termination collar 20 with the vertical surface 42 of the joist 40. FIG. 6 also shows lines 18 which are tangential to the collar section 22 and orthogonal to the vertical surface 42 of the joist 40. These lines 18 show clearly how the fasteners 38 are radially outward of these tangent lines 18 such that a screwdriver, hammer or other tool directly in line with the fasteners 38 would not be interfered with by the collar section 22 during installation. Also, the attachment arms 32 and support gussets 84 and 86 have a narrow region generally at the dotted line indicated at 52 or thereabouts. If the termination collar 20 is to be mounted in a location where the attachment arms 32A interfere with installation, it is a simple matter to twist and/or force the attachment arms 32 to break along these lines. This is especially useful where the termination collar 20 is mounted near a corner or adjacent a cross joist. In such an application, the surfaces defining voids 54*a* or 54*c* may be utilized to attach to the cross joist or corner. Looking to FIG. 3, when the termination collar is attached at a cross joist or corner, the ceiling thickness markers 112 may be used to properly offset the termination collar from the cross joist or collar. In this application, thickness adjustment is provided by the flange 74 which may be removed along break-away line 120 along with horizontal projection 44 and alignment tabs 50. The ceiling thickness markings 112 would then be used to properly align the termination collar 20 to the joist or stud to account for the thickness of the final surface 78. One example of such a final surface would be a layer of ½ inch drywall covered by a ½ inch layer of wood. This may result in a final thickness of 1 inch or more. This final thickness may interfere with installation of diffusers of some prior art designs without such thickness adjustment.

The surfaces defining voids 54 have other applications to diffusers which are screwed in place and have a preset mounting hole. These attachment holes 54 cannot be seen generally when the diffuser is being installed as they may be covered by the final surface 78 or a flange 88 on the diffuser. For this reason, alignment indicators 56 may be provided on the bottom opening 24 to indicate to the user the position of the hidden attachment holes 54.

In the example shown in FIG. 1, the collar section 22 comprises the duct attachment surface 30 having a duct radius 58. The collar section also comprises a larger surface 60 having a larger radius wherein a duct stop point 62 is provided there between. This is much more easily seen in FIG. 7. During installation, the ductwork may be screwed or otherwise fastened to the termination collar 20. As previously discussed in brief, the duct stop point 62 substantially prohibits the user from attaching the ductwork vertically below the stop point 62 and thus any screws or nails or other protruding fasteners would not interfere with a diffuser in that the diffuser often engages the inner surface 66. In some applications, the diffuser may engage the inner surface 66 up to an inner stop point 68. Thus, any fasteners projecting into this surface would not interfere with installation of the diffuser.

Looking to the example diffuser 76 shown in FIG. 16, the diffuser 76 has a radially outward surface 90 which fits into the inner surface 66 of the collar section 22. The diffuser 76 may press-fit into the termination collar 20, or may be held in place by fasteners through surfaces defining voids 94 in the flange 88. These fasteners may engage the surfaces defining voids 54 of the flange 74 as previously described. Alternatively or additionally, retaining clips 92 may be provided on the surface 90 of the diffuser 76 or on the inner surface 66 of the collar section 22. Such retaining clips aid in installation and retention of the diffuser into the termination collar 20.

Figure 15:
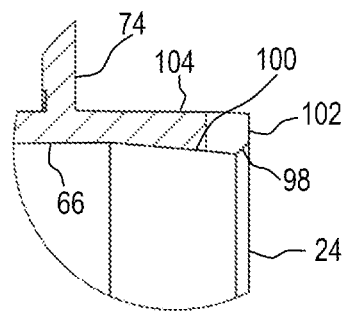
FIG. 15 is a detail view of the region 15 of FIG. 14.
Figure 14:
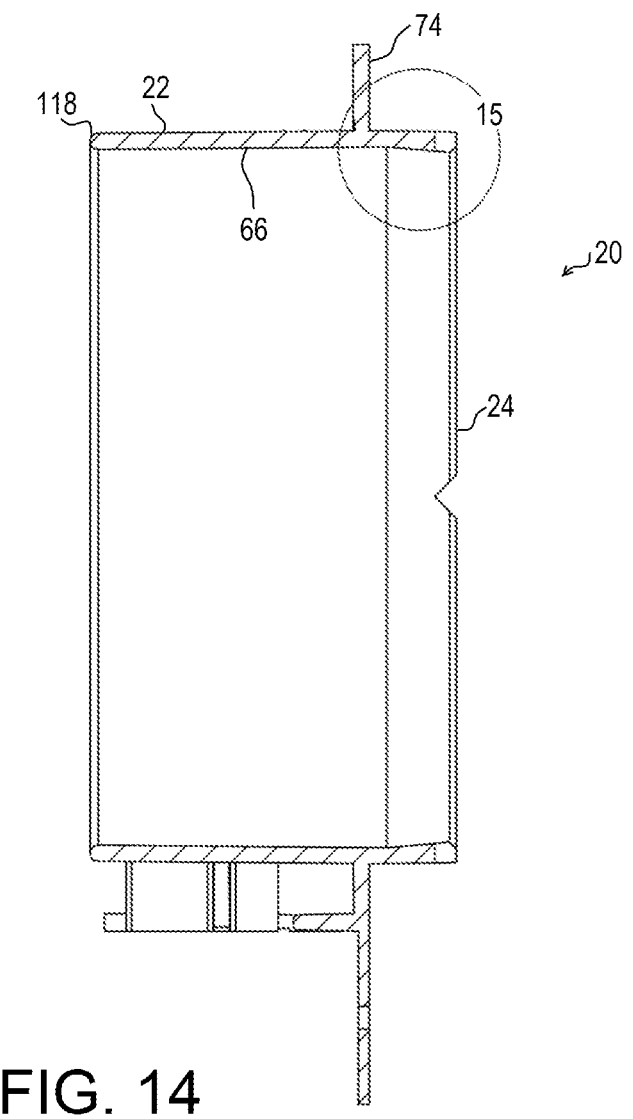
FIG. 14 is a side cutaway view of the example of FIG. 10.

In one example shown in FIG. 14 and the detail region of FIG. 15, it can be seen how the inner surface 66 of the collar section 22 may comprise a radial outward taper 98. Such a radial outward taper 98 aids in alignment of the surface 90 of the diffuser 76 during installation. As the longitudinally inward edge 96 [FIG. 16] of the diffuser 76 is placed adjacent the outward taper 98, the taper 98 aids in aligning and centering the diffuser 76 for easier installation. FIG. 1 also shows an example with a relatively larger inward taper 98 than that shown in FIGS. 14/15.

FIGS. 14/15 also show a termination collar 22 without the holding tabs 64, nor a duct stop point 62, although these components may be used in combination with the components and arrangements shown.

FIG. 15 also shows that in at least one example, the inner surface 66 comprises a radially inward taper 100. This radially inward taper 100 provides structural support by thickening the longitudinally outward edge 102 of the projection portion 104. This radially inward taper 100 also increases the ability of the termination collar to hold the diffuser 76 in place. When retaining clips 92 are utilized with the diffuser 76, the radially inward taper 100 provides a non-vertical surface against which the clips 92 engage for additional retention.

When installed, the outer surface 106 of the projection portion 104 is adjacent to a surface 108 defining a hole in the final surface 78. Generally, the final surface 78 covers most of the circumferential flange 74. The circumferential flange 74 in many examples has a longitudinally outward surface 110 adjacent the inner side of the final surface 78.

It may be desired to put a gasket 122 between the flange 74 and the final surface 78. Such gaskets may be foam rings, caulk, or other materials.

FIG. 7 also shows a protrusion 64 forming a retention tab. Such retentions tabs 64 are used in that flexible ductwork would be fitted past the holding tab 64 and then fastened in place by a wire tie, zip tie, rescue tape, duct tape or other such fastening system. The holding tab 64 keeps the duct from working loose off of the termination collar 20.

FIG. 7 clearly shows an additional outward edge taper 118 which helps in installation of ductwork which fits over the duct attachment surface 30 as previously described.

Figure 13:
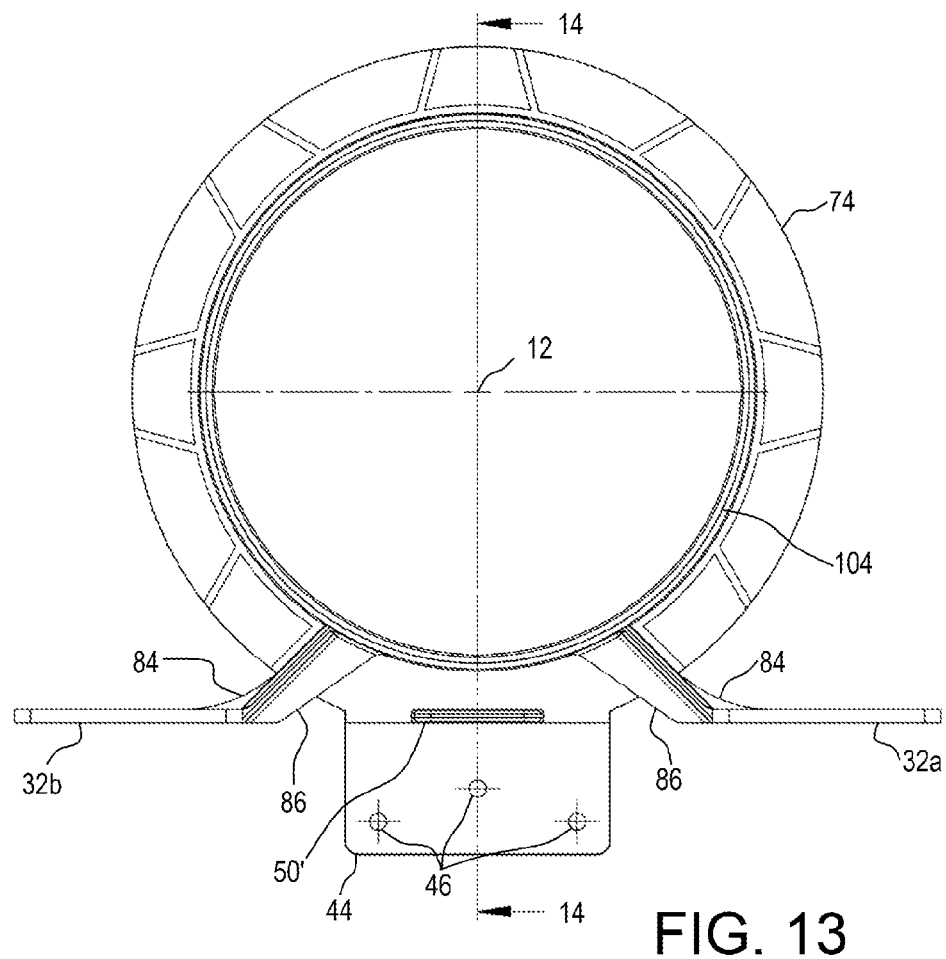
FIG. 13 is a bottom projection view of the example of FIG. 10.

FIG. 13 shows an example without the surfaces defining voids 54, alignment indicators 56, and with a unitary alignment tab 50'.

While the present invention is illustrated by description of several examples and while the illustrative examples are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

I claim:

1. An air duct termination collar comprising:
   a. a main body having a substantially cylindrical inner surface having a longitudinal center axis, the main body open at opposing first and second longitudinal ends to form a substantially unhindered air passageway therethrough;
   b. a plurality of vertical attachment arms projecting radially from the main body, each arm having a plurality of surfaces defining attachment voids aligned orthogonal to the center axis of the main body;
   c. each vertical attachment arm having a vertical attachment surface for attachment to a vertical side of a support joist;
   d. each vertical attachment arm having a narrow region between the attachment voids and the main body forming a break point for removal of the portion of the attachment arm radially outward from the break point;
   e. at least one horizontal projection having a horizontal surface through which are provided a plurality of surfaces defining voids aligned parallel to the center axis of the main body for attachment to a horizontal bottom side of a support joist;
   f. a substantially cylindrical air duct attachment surface on the radially outward surface of the first longitudinal end of the main body; and
   g. a substantially cylindrical radially inward diffuser attachment surface on the second longitudinal end of the main body.

2. The termination collar as recited in claim 1 wherein the termination collar is cast from a single mold.

3. The termination collar as recited in claim 1 further comprising a plurality of circumferential tear-away markers provided on the air duct attachment surface wherein the tear-away markers assist a user in removing equal diameter tear-away portions of the termination collar for low clearance applications.

4. The termination collar as recited in claim 3 wherein the tear-away markers extend circumferentially only partially around the termination collar for low clearance angle applications.

5. The termination collar as recited in claim 1 wherein the horizontal projection comprises a thin portion to be positioned between an attachment joist and a final wall/ceiling surface.

6. The termination collar as recited in claim 1 further comprising a flange having a plurality of surfaces defining diffuser attachment holes for connection to fasteners of a diffuser.

7. The termination collar as recited in claim 6 further comprising an alignment indicator radially inward from and circumferentially aligned with the diffuser attachment holes.

8. The termination collar as recited in claim 6 wherein the tear away markers are circumferential.

9. The termination collar as recited in claim 1 wherein the vertical attachment arm(s) comprise a lateral break point to aid in removing a portion of the attachment arm(s).

10. A method for installing an air duct termination collar comprising the steps of:
   a. selecting a tubular air duct termination collar open at both longitudinal ends with a protrusion portion on a first longitudinal end of the termination collar having an inner diameter slightly larger than the outer diameter of an insert portion of a diffuser to be installed;

b. fastening at least one vertical attachment arm of the air duct termination collar to a vertical surface of a joist;

c. fastening a horizontal projection of the air duct termination collar to a horizontal surface of the joist such that the projection portion of the termination collar extends outward of the joist;

d. attaching airflow ductwork to a duct attachment surface vertically opposite the protrusion portion wherein the duct attachment surface is a radially outward surface of a second longitudinal end of the termination collar;

e. installing a final interior surface to the joist(s) wherein the final surface has a surface defining a hole surrounding the projection portion of the termination collar; and f. installing a diffuser to cover the surface defining a hole in the final surface.

11. The method for installing a termination collar as recited in claim 10 wherein the diffuser comprises an extension portion, and the extension portion is press-fit into the protrusion portion of the termination collar.

12. The method for installing a termination collar as recited in claim 10 wherein the diffuser comprises a circumferential flange, and the circumferential flange is fastened to a circumferential flange projecting radially outward of the protrusion portion of the termination collar.

13. The method for installing a termination collar as recited in claim 10 further comprising the step of removing at least one circumferential tear-away portion from the air duct termination collar to facilitate installation in a low clearance application.

14. The method for installing a termination collar as recited in claim 13 wherein the tear-away portion does not extend circumferentially around the entire termination collar.

15. A method for installing a termination collar comprising the steps of:

a. selecting a termination collar with a protrusion portion having an inner diameter slightly larger than the outer diameter of an insert portion of a diffuser to be installed;

b. fastening at least one vertical attachment arm of the termination collar to a vertical surface of a joist;

c. fastening a horizontal projection of the termination collar to a horizontal surface of the joist such that the projection portion of the termination collar extends outward of the joist;

d. attaching ductwork to a duct attachment surface vertically opposite the protrusion portion;

e. installing a final interior surface to the joist(s) wherein the final surface has a surface defining a hole surrounding the projection portion of the termination collar;

f. installing a diffuser to cover the surface defining a hole in the final surface; and g. wherein the vertical attachment arm(s) comprise a relatively thin region forming a lateral break point and the method further comprises the step of removing a portion of the attachment arm(s) along the lateral break point.

* * * * *